(12) United States Patent
Shinohara et al.

(10) Patent No.: US 7,777,802 B2
(45) Date of Patent: *Aug. 17, 2010

(54) IMAGING APPARATUS INCLUDING AN AUTO FOCUSING FUNCTION

(75) Inventors: Junichi Shinohara, Tokyo (JP); Kohichi Sugiura, Tokyo (JP); Kenji Shiraishi, Tokyo (JP); Takashi Kajiyama, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 323 days.

This patent is subject to a terminal disclaimer.

(21) Appl. No.: 11/873,190

(22) Filed: Oct. 16, 2007

(65) Prior Publication Data

US 2008/0036901 A1 Feb. 14, 2008

Related U.S. Application Data

(63) Continuation of application No. 10/636,712, filed on Aug. 8, 2003, now Pat. No. 7,301,579.

(30) Foreign Application Priority Data

Aug. 8, 2002 (JP) ............................. 2002-231065

(51) Int. Cl.
*H04N 5/232* (2006.01)
(52) U.S. Cl. ........................... 348/348; 348/353
(58) Field of Classification Search ........... 348/348, 348/353, 354, 359, 345; 396/102, 104, 125, 396/77, 79, 80, 82
See application file for complete search history.

(56) References Cited

U.S. PATENT DOCUMENTS

| | | | |
|---|---|---|---|
| 5,070,356 A | 12/1991 | Nakamura et al. | |
| 5,150,143 A | 9/1992 | Ohno et al. | |
| 5,192,860 A | 3/1993 | Shinohara et al. | |
| 5,192,964 A | 3/1993 | Shinohara et al. | |
| 5,270,755 A | 12/1993 | Ohno et al. | |
| 5,293,034 A | 3/1994 | Ohno et al. | |
| 5,309,190 A | 5/1994 | Shinohara et al. | |
| 5,682,563 A | 10/1997 | Shinohara et al. | |
| 5,751,354 A | 5/1998 | Suzuki et al. | |

(Continued)

FOREIGN PATENT DOCUMENTS

JP 10-229516 8/1998

(Continued)

*Primary Examiner*—Jason Chan
*Assistant Examiner*—Nicholas G Giles
(74) *Attorney, Agent, or Firm*—Oblon, Spivak, McClelland, Maier & Neustadt, L.L.P.

(57) ABSTRACT

An AF controlling unit (83) starts an outside light AF operation controlled by an outside AF unit (81) by a half-pressing of a shutter release button (61), and a change over between the outside AF operation and a CCDAF operation controlled by a CCDAF unit (82) is controlled corresponding to an elapsed time t (timer 84) from a starting of the operation of the outside light AF operation and a pressing condition (a detection of the half-pressing by a half-pressed detecting unit (62), the detection of a full-pressing by a full-pressed detecting unit (63) or a press-in releasing) of a shutter release button (61) after the starting of the outside light AF operation controlled by the outside AF unit (81) by the half-pressing of the shutter release button (61).

9 Claims, 4 Drawing Sheets

U.S. PATENT DOCUMENTS

| | | |
|---|---|---|
| 6,487,369 B1 | 11/2002 | Sato |
| 6,763,187 B2 | 7/2004 | Shiraishi |
| 6,967,686 B1 * | 11/2005 | Tanaka ........................ 348/352 |
| 7,158,182 B2 | 1/2007 | Watanabe et al. |
| 7,184,090 B2 | 2/2007 | Watanabe et al. |
| 7,212,230 B2 | 5/2007 | Stavely |
| 2002/0140840 A1 | 10/2002 | Kindaichi |
| 2003/0081137 A1 | 5/2003 | Yamazaki |
| 2003/0231291 A1 | 12/2003 | Kitajima et al. |
| 2004/0091254 A1 | 5/2004 | Shiraishi |
| 2004/0130628 A1 | 7/2004 | Stavely |
| 2006/0268147 A1 | 11/2006 | Ito |

FOREIGN PATENT DOCUMENTS

| | | |
|---|---|---|
| JP | 2001-255456 | 9/2001 |
| JP | 2002-175297 | 6/2002 |

* cited by examiner

IMAGING APPARATUS INCLUDING AN AUTO FOCUSING FUNCTION

This present application is a continuation application of application Ser. No. 10/636,712, filed Aug. 8, 2003 now U.S. Pat. No. 7,301,579, which claims the benefit of priority from the prior Japanese Patent Application No. 2002-231065 filed Aug. 8, 2002.

BACKGROUND OF THE INVENTION

1. Field of the Invention

The present invention relates to an imaging apparatus, more specifically, to an improvement in the imaging apparatus provided with two auto focusing devices for carrying out auto focusing operations of mutually different kinds.

2. Description of the Prior Art

Conventionally, an imaging apparatus such as a still camera or a video camera is provided with an auto focusing (AF) device for adjusting a focusing of an image of a subject in optimum.

The AF device in a conventional still camera or the like for recording the image of the subject to a recording medium such as a film of video tape and so on, so-called an outside light AF operation such as an active AF which moves a photographic optical system such as a focus lens to a focusing position corresponding to an obtained distance obtained by calculating the distance to the subject based on a time taking for a reflected wave to return from the subject by projecting a near-infrared ray or an ultrasound wave or the like for example to the subject, or a passive AF which moves the photographic optical system such as the focus lens to the focusing position corresponding to the obtained distance obtained by calculating the distance to the subject based on a phase contrast, have been applied.

In the imaging apparatus (there may be an occasion referred to as a digital camera appropriately hereunder) which projects the image of the subject to an imaging device such as a CCD or the like and takes out the projected image as an electric signal, the AF operation can be carried out based on the image of the subject that actually imaged to the imaging device through the focus lens or the like since the image can be taken out as an image signal substantially simultaneously to projection of the image.

That is to say, in the AF operation, the contrast (including a sharpness of the image) of the image signal obtained by the imaging device is evaluated in real time in every movement of the focus lens or the like while moving the focus lens or the like, and the movement of the focus lens or the like is stopped at the position where a value which is evaluated becomes maximum. This is referred to as a CCDAF operation or a contrast AF operation.

The CCDAF operation has an advantage that a focusing accuracy is extremely high since it is the AF that carries out the AF operation by evaluating the image that is actually projected to the imaging device.

On the other hand, there is a problem that it takes a long time to complete the AF operation when a repeating frequency of successive operations which include accumulation of image, transfer, computation of evaluated value and comparison are increased.

Consequently, the time taking from starting to completion of the AF operation, more specifically, a time-lag gravely influences the focusing of the image of the subject in such a circumstance that photographing the subject that moves at a high speed, and as the AF operation is not completing, there is an occasion that the photographing cannot be performed in a desired timing.

Also, since the CCDAF operation evaluates the actual image of the subject, there is an occasion that an appropriate focusing operation cannot be carried out in a circumstance that the entire contrast is low.

On the contrary, although the aforementioned outside light AF operation is inferior to the CCDAF operation in terms of the focusing accuracy, it is possible to follow effectively to a dynamic subject and to prevent photograph timing from losing since the above mentioned time-lag is small.

In addition, the outside light AF operation has an advantage that it is generally hard to be influenced by the contrast of the subject as the outside light AF operation measures based on an arrival time of the reflected wave when performing its AF operation by projecting the near-infrared ray or the like.

In this connection, there is proposed an imaging apparatus having two AF devices which are an outside light AF device for carrying out the outside light AF operation and the CCDAF device and a CCDAF device for carrying out the CCDAF operation capable of switching over by a selection of either of the AF operations alternatively in corresponding to a photographing situation or a situation of the subject (Japanese Patent Laid Open such as No. 2001-255456).

But, according to the above art, a user invariably has to carry out a prior selecting operation when selecting either of the AF operations in a case of choosing either of them.

That is to say, when photographing the dynamic subject, it is necessary to carry out the photographing after setting a photographing mode to a time-lag priority mode (focusing speed priority mode) that corresponds to the outside light AF operation by operating a dial for switching over the photographing mode or a switching button or the like beforehand, and on the other hand, when photographing the image that the focusing accuracy is called for, it is necessary to carry out the photographing after setting the switching button or the like to a focusing accuracy priority mode that corresponds to the CCDAF before photographing.

For example, during the photographing in the focusing accuracy priority mode, when the dynamic subject is suddenly appeared in sight and trying to take the photograph of it, at first the user has to carry out the selecting operation of the photographing mode so as to change over the AF operation to the time-lag priority mode.

Consequently, there has been a problem that the desired image cannot be obtained due to the loss of photographing timing by a hesitation in the switching operation of the mode or lose sight of the subject by adverting the user's eyes from the subject in order to carry out the switching operation.

Therefore, the applicant has proposed an imaging apparatus capable of changing over the AF operation appropriately with in a range of a normal photographing operation (Japanese Patent Application No. 2002-175297).

This imaging apparatus is provided so as to automatically change over the outside light AF operation or the CCDAF operation corresponding to an operating time in which the user has taken for a pressing operation from a half-pressed position to a full-pressed position of a release button.

That is to say, when the user presses the release button throughout the entire stroke from an initial position to the full-pressed position continuously at once (hereunder it is called at-once pressing), the operating time taking from the half-pressed position which is set at a middle part of the entire stroke to the full-pressed position is extremely short, therefore the outside light AF operation with the time-lag priority is selected since such operation represents the user's intension that wishes to release the shutter quickly.

On the other hand, when the user once stops the pressing operation at the half-pressed position and then pressed to the full-pressed position, the time taking for the pressing operation from the half-pressed position to the full-pressed position is long and correspondingly the CCDAF operation with the focusing accuracy priority is selected since such operation represents the user's intension that wishes to carry out the focusing carefully by performing a focus locking at the half-pressed position.

According to the proposed art, the user can instantaneously change over the two kinds of AF operations by the operation within the normal photographing operation for pressing the shutter release button so that the loss of photographing timing or erroneously photographing the image that the focusing accuracy is low can be avoided.

By the way, according to the above proposed art by the present applicant, it simply changes over the AF operation by an elapsed time taking from a half-pressed to a full-pressed, therefore how to set a threshold value (criterion time, reference time) to the elapsed time is important in the actual photographing situation.

For example, it can be conceived to set the time taking from starting of the outside light AF operation to completion of the outside light AF operation by the half-pressing of the shutter release button as the above mentioned criterion time.

In this instance, when the shutter release button is fully-pressed during the operation of the outside light AF operation (elapsed time<criterion time or elapsed time≦criterion time), the performing of the photographing is performed soon after the operation of the outside light AF operation is completed since it can be considered that the intention of the quick photographing performing is called for, and when the shutter release button is fully-pressed after the outside light AF operation is completed (criterion time≦elapsed time or criterion time<elapsed time) the performing of the photographing is carried out by switching from the outside light AF operation to the CCDAF operation since it can be considered that the photographing performing is not in a hurry.

But, an initial position of the focus lens at the time the shutter release button is half-pressed and the outside light AF operation starts is not always in a regular position in every photographing, where a stopped position of the last photographing performing becomes the initial position of the current photographing. In addition, since a focusing position as a moving target position that is calculated by the outside light AF operation varies in every time corresponding to a distance value to the subject, the time required from starting of the outside light AF operation (initial position) to the completion of the operation (focusing position) varies in every photographing.

Consequently, if the time from starting of the outside light AF operation to its completion is set as the above mentioned criterion time, this criterion time varies in every photographing and therefore it can be considered that it may being set extremely short time beyond the user's prediction.

Furthermore, in such a case as above mentioned, even if the user has pressed the shutter release button at once such as the half-pressing and then to the full-pressing by the intention of selecting the outside AF operation, there is likely that the function automatically becomes changed to the CCDAF operation against the user's intention.

In addition, in the actual photographing circumstance, there may be cases that further pressing of the shutter release button is ceased even though the half-pressing operation of the shutter release button is performed, or the circumstance may have changed to such a photographing circumstance that the quick shutter release is wished during the CCDAF is in operation even though once having intentionally operated to select the CCDAF operation.

SUMMARY OF THE INVENTION

The present invention has been made in view of the aforementioned circumstances and it is therefore an object of the present invention to provide an imaging apparatus capable of changing over two kinds of AF operations within a range of a normal photographing operation corresponding to a photographing circumstance appropriately.

To accomplish the aforementioned object, according to an imaging apparatus relating to the present invention, a first auto focusing operation is started by a half-pressing of a shutter release button, a change over between the first auto focusing operation and a second auto focusing operation is controlled corresponding to an elapsed time from starting of the operation of the first auto focusing operation and a pressing condition of the shutter release button after the elapsed time, while starting of the first auto focusing operation by the half-pressing of the shutter release button.

More specifically, according to the imaging apparatus of the present invention, it comprises a photographic optical system for projecting an image of a subject; an imaging device for outputting the projected image of the subject by converting the projected image of the subject into an image signal; a first auto focusing device for carrying out a first auto focusing operation which moves relatively at least one of a part or entire of the photographic optical system and the imaging device to a focusing position corresponding to a distance value obtained by measuring a distance to the subject; a second auto focusing device for carrying out a second auto focusing operation which moves relatively the at least one of the part or entire of the photographic optical system and the imaging device while evaluating an image signal which is in a sequence obtained through the photographic optical system, and stops the at least one of the part or entire of the photographic optical system and the imaging device to a focusing position based on the evaluation; a control device for controlling the first auto focusing operation and the second auto focusing operation; a shutter release button; a starting signal inputting device for inputting a command for starting a focusing operation; and a performing signal inputting device for inputting a command for performing a photographing operation and a timer.

The starting signal inputting device inputs the command for starting at a half-pressed position of the shutter release button; the performing signal inputting device inputs the command for performing at a full-pressed position of the shutter release button; and the control device starts the first auto focusing operation when the command for starting is inputted into the starting signal inputting device and controls the first auto focusing operation and the second auto focusing operation corresponding to an elapsed time from the inputting of the command for starting clocked by the timer, a condition of inputting the command for starting into the starting signal inputting device and a condition of inputting the command for performing into the performing signal inputting device at a time after the command for starting is inputted.

Here, the imaging apparatus includes a digital still camera (electric camera) or a similar video camera, or other various image inputting devices for imaging the image of the subject by operating a shutter.

In addition, the imaging device stands for an imaging device constituted by solid imaging elements such as a CCD or a CMOS or other photoelectric transfer elements and is capable of taking out the projected image as the image signal such as an electronic signal in substantially real time.

The photographic optical system stands for an optical system such as a focus lens (includes a group of focus lenses constituted by a plurality of lenses) for projecting the image of the subject to the imaging device and imaging it, and movable lens such as the focus lens is included in the imaging apparatus that the imaging device is fixed and arranged.

On the other hand, in the imaging apparatus that is capable of moving the imaging device relatively to an optical axis of the photographic optical system to the photographic optical system, it is not necessarily have to include the movable lens since it is possible to move the imaging device to be focused.

Measuring the distance to the subject means, specifically, for example, projecting an infrared ray or an ultrasound wave to the subject and ranging based on an arriving time of a reflected light returned from the subject, or ranging based on a phase contrast between the subject images that are respectively projected to a binocular ranging-use CCD arranged in predetermined distance, or applying the other known various ranging methods.

As a result, it is possible to apply, so called an active AF operation or an outside light AF operation which is by a passive AF operation as the first auto focusing operation based on the distance ranged in such a way as mentioned above.

Obtaining the distance value by measuring the distance is not limited to obtaining "distance value" itself as a physical quantity, it means obtaining an angle corresponding to the distance value, for example, in triangular surveying or the physical quantity of a reflected arriving time and so on of the infrared ray or the like, without computing actually the distance value as the physical quantity.

Therefore, when computing of the distance value as the physical quantity is not carried out, "the focusing position corresponding to the distance value" stands for "the focusing position relates to the physical quantity corresponding to the distance value".

At least one of the part or entire of the photographic optical system and the imaging device stands for one of the following five conditions, which are:
1. only part of the photographic optical system,
2. only entire of the photographic optical system,
3. only the imaging device,
4. part of the photographic optical system and the imaging device, and
5. entire of the photographic optical system and the imaging device.

Therefore, the sentence "moves relatively at least one of" which is defined by the above mentioned conditions does not necessarily limited to move the photographic optical system (also including a case only having part of the optical system in the photographic optical system) and it may also be recommendable to adapt the photographic optical system to move so as the image of the subject to be imaged on the imaging device, or move the imaging device or move both of them.

Evaluating the image signal obtained through the photographic optical system stands for the evaluation of the image of the subject that is projected to the imaging device, and evaluating the subject image stands for obtaining a value (such as a differential value of the image signal) corresponding to the focusing condition of the subject image such as a contrast, a sharpness of the subject image or the like and obtaining the maximum value of the value based on the image signal that represents the obtained subject image for example.

In other words, for example, the sharpness of the subject image can be represented with the differential value of the image signal with respect to a contour or the like of the subject, and when the differential value is maximum, the subject image is properly imaged, that is to say, the subject image is in a condition that it is focused on the imaging device.

Evaluating the image signal which is in a sequence stands for evaluating respectively the image signal that is obtained in every relative moving position of at least one of the imaging device or the aforementioned photographic optical system.

Further, in every moving position stands for the every appropriate moving position in a direction of the optical axis, and if such a composition that the optical system is moved in the direction of the optical axis direction as it is revolved in spiral about the optical axis, it stands for the appropriate angle of the revolving or an appropriate time interval.

For example of the second auto focusing operation, so-called a CCDAF operation or a contrast AF operation can be applied.

In addition, the CCDAF operation or the contrast AF operation that may be applied to as the second auto focusing operation includes so-called a hybrid AF (hereunder, HBAF) operation.

The HBAF operation is an AF operation which calculates the focusing position of the photographic optical system corresponding to the distance to the subject that is obtained by a ranging device such as a ranging censor or the like as similar to the outside AF operation and applying the contrast AF operation or the CCDAF operation only in a peripheral area of the focusing position obtained by the calculation.

The HBAF operation has an advantage that it can greatly reduce a time required for completion of the AF operation compared with such an operation that carries out the contrast AF operation to entire area of the photographic optical system's movable area (Japanese Patent Laid Open H10-229516 for example).

Also, the half-pressed position of the shutter release button is not required to position at middle position of the entire stroke of the shutter release button, it is recommendable to position between a position which the shutter release button is not at all pressed and the full-pressed position which the shutter release button is fully-pressed at the entire stroke or a position just before the full-pressed position, and it is preferable to provide a clicking mechanism or a clicking member or the like for giving some sorts of a moderation or a resistance at the half-pressed position in order to recognize a user that presses the shutter release button to the half-pressed position.

The timer is not limited clocking a time directly, it may be recommendable to provide the timer by a pulse generator for generating a clocking signal with an appropriate cycle and a counter for counting number of pulses of the clocking signal that is generated by the pulse generator.

In an embodiment of the imaging apparatus, the control device starts the first auto focusing operation with so-called a time-lag priority so as to start a photographing preparation that is even capable of responding to a dynamic subject at the time the shutter release button is passed the half-pressed position since the shutter release button invariably passes the half-pressed position before reaching (performing photographing) to the full-pressed position.

In the imaging apparatus, a completed condition of the first auto focusing operation is maintained as it is, when the command for performing the photographing operation is not inputted, that is to say, when the shutter release button is not pressed to the full-pressed position until the shutter release button is pressed to the full-pressed position in a case which the first auto focusing operation is completed prior to previously set predetermined criterion time elapses from starting of the first auto focusing operation.

The control device controls so as to maintain a completed condition of the first auto focusing operation prior to a period which the command for performing is inputted into the performing signal inputting device in a period which the elapsed time reaches to a predetermined criterion time from a time of completion of the first auto focusing operation when the first auto focusing operation is completed before the elapsed time reaches to the predetermined criterion time and the inputting of the command for starting to the starting signal inputting device is maintained and the command for performing is not inputted into the performing signal inputting device at the time of completion of the first auto focusing operation.

Also, the imaging apparatus controls to shift automatically to the second auto focusing operation when the command for performing the photographing is not inputted within the aforementioned criterion time.

The control device, also, controls so as to start the second auto focusing operation when the command for performing is not inputted into the performing signal inputting device during the period the elapsed time reaches to the criterion time from the time of completion of the first auto focusing operation.

The imaging apparatus performs the photographing by returning to the completed condition of the first auto focusing operation which is before shifting to the second auto focusing operation when the command for performing the photographing is inputted before the second auto focusing operation is completed even after the second auto focusing operation is started by shifting from the first auto focusing operation to the second auto focusing operation.

In the imaging apparatus, further the control device controls so as to perform the photographing operation by ceasing the second auto focusing operation and returning to the completed condition of the first auto focusing operation when the command for performing is inputted into the performing signal inputting device after starting and before completion of the second auto focusing operation.

The imaging apparatus performs the photographing by selecting whether to return to the completed condition of the first auto focusing operation which is before shifting to the second auto focusing operation or to continue until the second auto focusing operation is completed corresponding to a time required to perform them when the command for performing the photographing is inputted before the second auto focusing operation is completed even after the second auto focusing operation is started by shifting from the first auto focusing operation to the second auto focusing operation.

The control device, further, controls so as to perform the photographing operation by comparing a time required for returning to the completed condition of the first auto focusing operation by ceasing the second auto focusing operation with an estimated time required for completion of the second auto focusing operation by continuing the second auto focusing operation, and by selecting and performing the operation that completes in shorter time between the two operations when the command for performing is inputted into the performing signal inputting device after starting and before completion of the second auto focusing operation.

The control device controls so as to perform the photographing operation by completion of the first auto focusing operation at a time of inputting the command for performing when the command for performing is inputted into the performing signal inputting device during the period the elapsed time reaches to the criterion time from the time of completion of the first auto focusing operation.

The control device controls so as to start the second auto focusing operation from the focusing position of the at least one of the part or entire of the photographic optical system and the imaging device in the first auto focusing operation when the elapsed time reaches to a predetermined criterion time before completion of the first auto focusing operation.

In the imaging apparatus, the first auto focusing device sets a constant focusing position as the focusing position corresponding to the distance value when the distance value cannot be obtained with a predetermined accuracy and the control device controls so as to start the second auto focusing operation from a position where the relative movement by the first auto focusing device is completed regardless of the elapsed time.

For example, there may be a case the distance value cannot be calculated or a reliability of the measured distance value is low when a directional character of a profile line of the subject is not suitable for measuring the distance value in the first auto focusing operation or when the subject is in low contrast which a passive AF device is weak at.

In such a case, the first auto focusing device cannot set the focusing target position corresponding to the distance value itself.

But according to the imaging apparatus relates to the eighth aspect of the present invention as constituted as stated above, the first auto focusing device sets so-called the constant focusing position as a moving target position (focusing position).

DESCRIPTION OF THE PREFERRED EMBODIMENTS

The specific embodiment of the present invention regarding an imaging apparatus relates to the present invention will be described with reference to the accompanying drawings hereunder.

Figure 1:
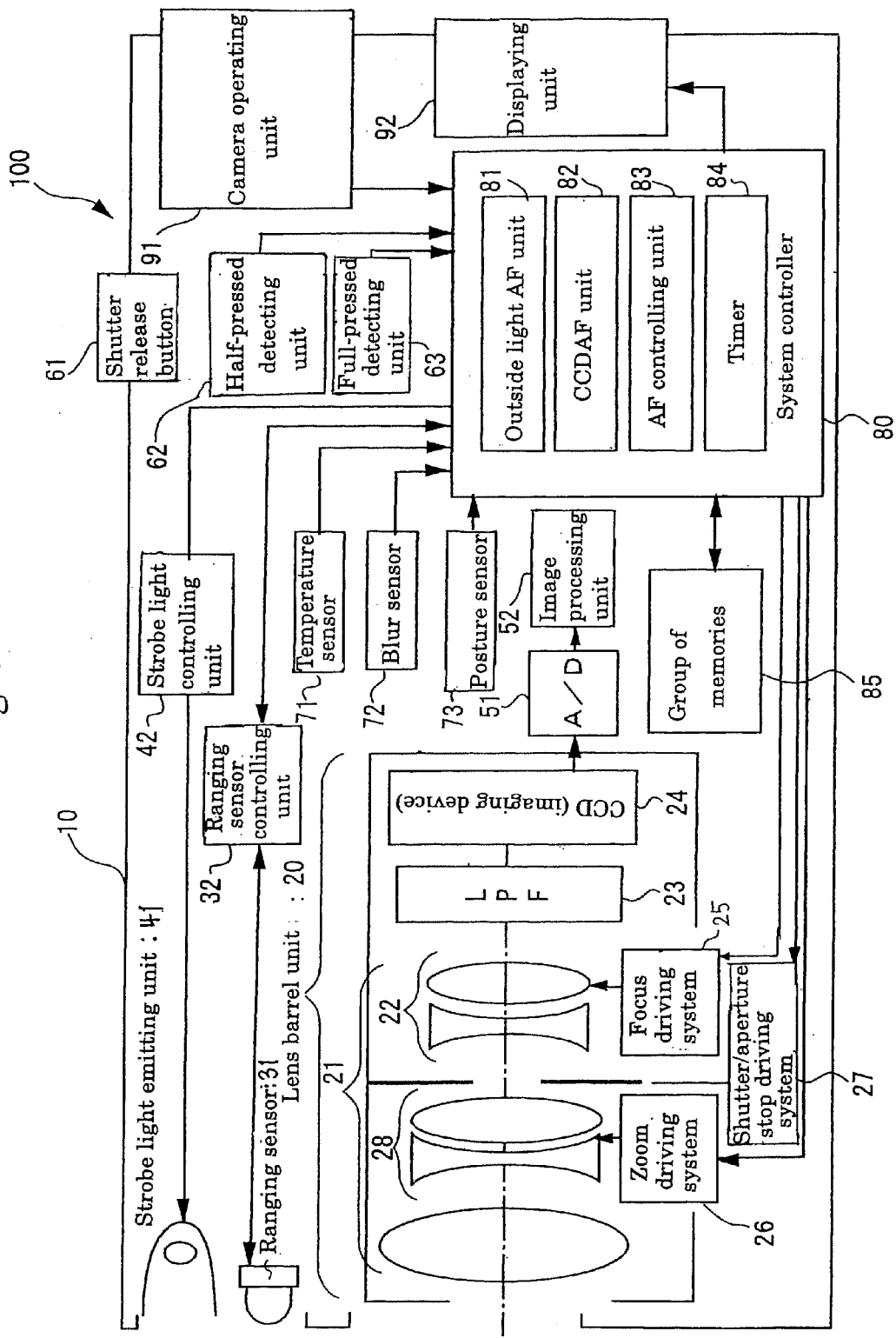
FIG. 1 is a block diagram showing a digital camera which is one example of the embodiments regarding an imaging device relating to the present invention.
Figure 2:
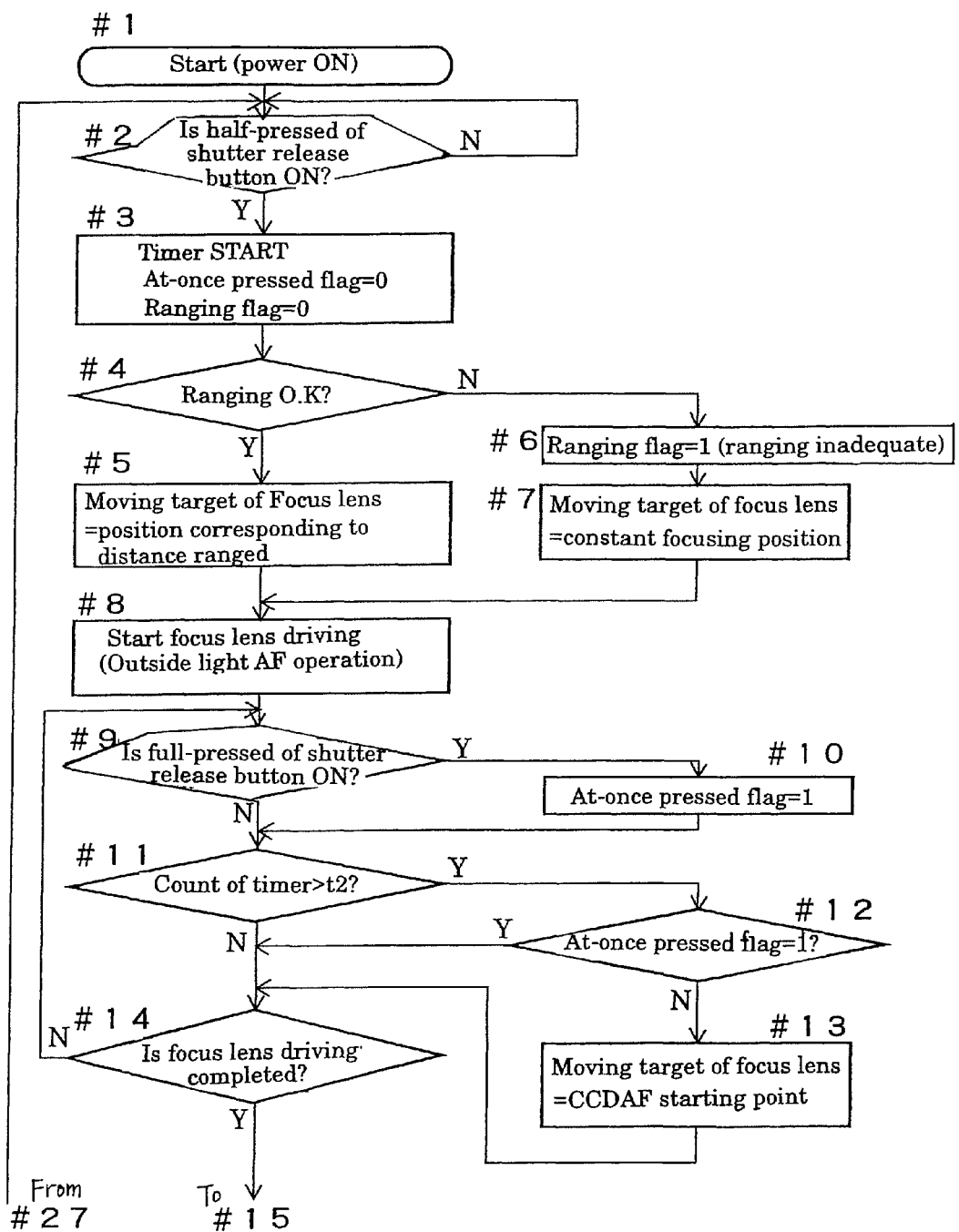
FIG. 2 is a first flowchart showing a process of an AF control and a photographing performing in the digital camera shown in FIG. 1.
Figure 3:
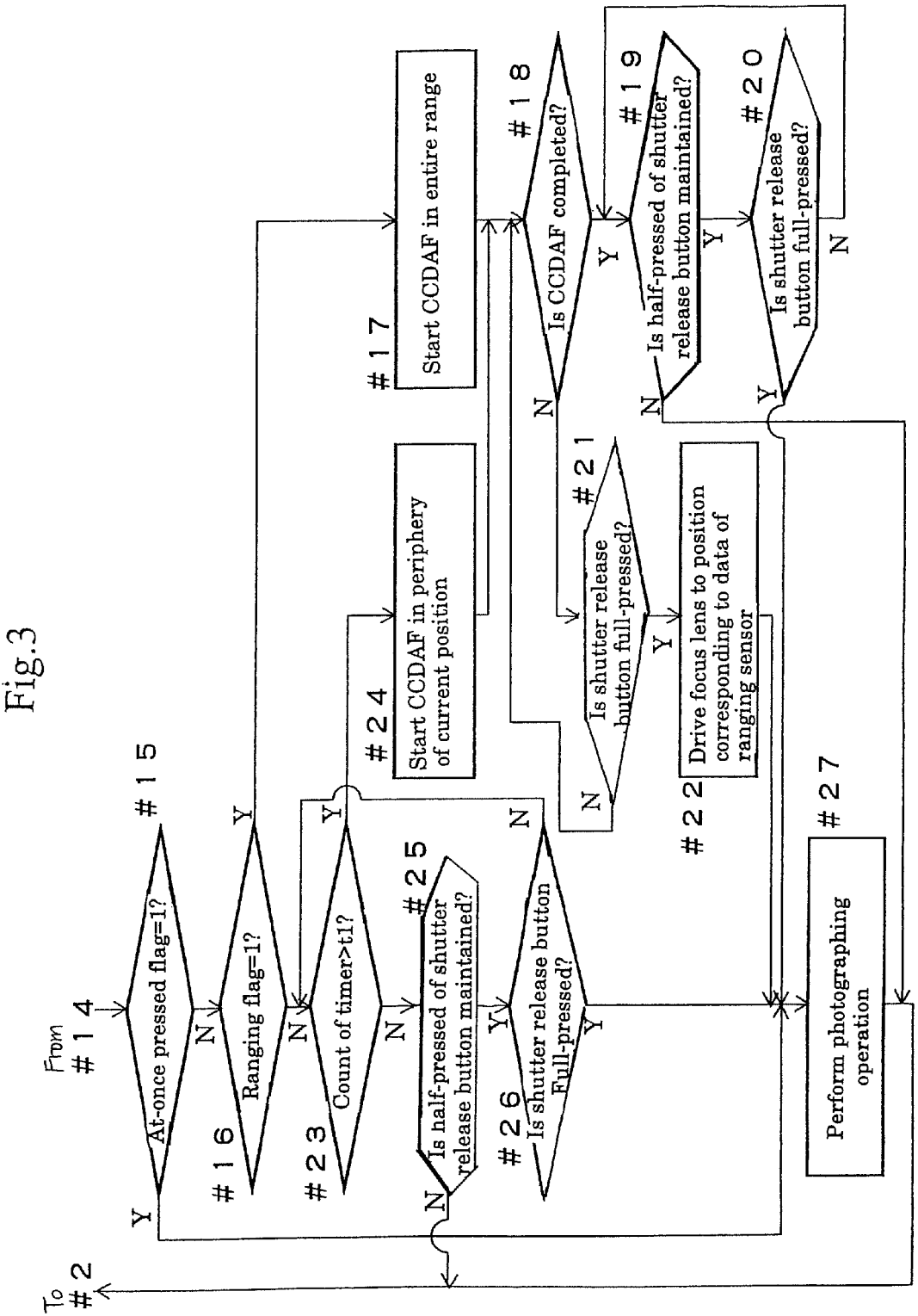
FIG. 3 is a second flowchart showing the process of the AF control and the photographing performing in the digital camera shown in FIG. 1.

FIG. 1 is a block diagram showing a digital camera 100 as one example of the embodiment regarding the imaging apparatus relates to the present invention, FIG. 2 and FIG. 3 are a flowchart showing a control of an auto focusing operation of the digital camera 100 shown in FIG. 1.

Inside of a chassis 10 of the digital camera shown in FIG. 1, a camera operating unit 91, a displaying unit 92, a strobe light emitting unit 41, a lens barrel 20, a system controller 80, a shutter release button (release pressing unit) 61 and various sensors are installed.

The lens barrel 20 provided with a photographic optical system 21, a CCD (imaging device) 24 on which an image of a subject that is projected through the photographic optical system 21 is imaged, a low pass filter (LPF) 23 arranged between the photographic optical system 21 and the CCD 24, a focus driving system 25 in the photographic optical system 21 for moving a group of focus lenses 22 in an optical axis direction, a zoom driving system 26 in the photographic optical system 21 for moving a group of zoom lenses 28 in the optical axis direction, an aperture stop 29 arranged between the group of zoom lenses 28 and the group of focus lenses 22, and a shutter/aperture stop driving system 27 for adjusting a divergence of the aperture stop 29.

Connected to the CCD 24 is an A/D converter 51 for digitalizing an electric signal which is outputted from the CCD 24, and an image processing unit 52 is connected to the A/D converter 51 for signal processing an image signal which is digitalized, and the digitalized signal which is signal processed at the image processing unit 52 is configured to be inputted into the system controller 80.

The strobe light emitting unit 41 is connected to the system controller 80 through a strobe light controlling unit 42.

The shutter release button 61 is provided with a half-pressed detecting unit (starting signal inputting device) 62 for detecting a half-pressed condition at a half-pressed position and at a position in a pressing direction beyond the half-pressed position of the shutter release button 61, and a full-pressed detecting unit (performing signal inputting device) 63 for detecting a full-pressed condition at a full-pressed position of the shutter release button 61.

Moreover, the half-pressed detecting unit 62 and the full-pressed detecting unit 63 are each connected to the system controller 80, and a detected signal in the half-pressed condition (command for starting an AF operation) and a detected signal in the full-pressed condition (command for performing a photographing) are inputted into the system controller 80.

A visible image represented by the digital signal which is the signal processed at the image processing unit 52 and inputted into the system controller 80, or various information that set at the camera operating unit 91 is displayed on the displaying unit (such as a liquid crystal monitor) 92.

The various sensors include a ranging sensor 31, a temperature sensor 71, a blur sensor 72 and a posture sensor 73 for example, and the system controller 80 applies various compensation process to the inputted digital signal corresponding to a temperature, blurring situation or a camera posture that detected by the temperature sensor 71, the blur sensor 72 and the posture sensor 73.

The ranging sensor 31 is a sensor for obtaining a distance to the subject for an outside light AF operation which will be described later and is connected to the system controller 80 through a ranging sensor controlling unit 32.

There is connected a group of memories 85 to the system controller 80, and the group of memories 85 includes Smart Media™ or Compact Flash® or the like that are capable of detaching from or attaching to the chassis 10 in a memorized condition of the digital signal representing a photographed image.

The group of memories 85 includes setting information that is set at the camera operating unit 91 or a flash memory that temporally memorize the information delivered from the system controller 80 rewritably, or a ROM that an information is written unrewritably.

In addition, a first criterion time t1 (for example, t1=100 m/sec) which is a criterion for determining whether the shutter release button 61 is pressed at-once or not and a second criterion time t2 which is shorter time than the first criterion time t1 are memorized to the ROM for an AF switching over control which will be described later.

Furthermore, the system controller 80 includes an outside light AF unit 81, an AF controlling unit 83 and a timer 84.

Here, the outside light AF unit 81 is an AF unit for controlling the focus driving system 25 so as to move the group of lenses 22 to a focusing position corresponding to the distance to the subject inputted from the ranging sensor 31 through the ranging sensor controlling unit 32.

Also, the outside light AF unit 81 controls the focus driving system 25 so as to move the group of focus lenses 22 to a constant focusing position when ranging the distance to the subject by the ranging sensor 31 could not be performed appropriately.

On the other hand, a CCDAF unit 82 is the AF unit for moving the group of focus lenses 22 while sequentially evaluating the digital signal which is projected on the CCD 24 through the group of focus lenses 22 and the LPF 23 and inputted into the system controller 80, and for controlling the focus driving system 25 so as to stop the group of focus lenses 22 at the focusing position based on the evaluation.

The timer 84 clocks an elapsed time from the detection of the half-pressed condition detected by the half-pressed detecting unit 62 of the shutter release button 61.

The AF controlling unit 83 carries out a switching over control of an outside AF operation operated by the outside light AF unit 81 and a CCDAF operation operated by the CCDAF operation 82 corresponding to the detection of the half-pressed condition detected by the half-pressed detecting unit 62 of the shutter release button 61, the detection of the full-pressed condition detected by the full-pressed detection unit 63, the elapsed time clocked by the timer 84 and the detection of the half-pressed condition and the full-pressed condition after the detection of the half-pressed condition.

The specific changing over control of the AF operation by the AF controlling unit 83 is as follows.

First, start the outside light AF operation when the command for starting the AF operation is inputted from the half-pressed detecting unit 62.

At this time, the elapsed time is also clocked from the command for starting the AF operation by starting of activation of the timer 84.

Then, control so as to maintain a completed condition of the outside light AF operation within a period that the elapsed time t reaches to the first criterion time t1 until the full-pressed condition is detected when the shutter release button 61 is not adapted to be in the full-pressed condition from the half-pressed condition at the time of completion of the outside light AF operation in a case where the outside light AF operation is completed before the elapsed time t of the timer 84 reaches to the previously set first criterion time t1.

Furthermore, the CCDAF operation of the CCDAF unit 82 is changed over from the outside light AF operation when the full-pressed condition is not detected within the period that the elapsed time t reaches to the first criterion time t1 from the time of completion of the outside light AF operation. When changing over, temporally memorize to the group of memories' flash memory a stopped position (focusing position by the outside light AF operation) of the group of focus lenses 22 at the time when the outside light AF is completed.

Still furthermore, when the full-pressed condition is detected before completion of the CCDAF operation after having changed over to the CCDAF operation, cease the CCDAF operation and retrieve the focusing position of the outside light AF operation which is temporally memorized to the flash memory, change over to the outside light AF operation so as to move the group of focus lens to the focusing position and perform the photographing operation after the completion of the moving.

On the other hand, when the full-pressed condition is detected during the period the elapsed time t reaches to the first criterion time t1 from the time the initial outside light AF operation is completed, the photographing operation is performed at the focusing position where the out side light AF has been completed.

Also, when the elapsed time t has reached to the second criterion time t2 before the initial outside AF operation is completed, change over to the CCDAF operation by having the focusing position by the outside AF operation as the operation starting position.

By the way, when the outside light AF unit 81 controls the focus driving system 25 so as to move the group of focus lenses 22 to the constant focusing position, control so as to start the CCDAF operation from the position of the focus lens which is the position where the outside light AF operation has been completed after the completion of the outside light AF operation regardless of the elapsed time t.

Next, an operation of the digital camera 100 relating to the present embodiment will be described with reference to a flowchart shown in FIG. 2.

First of all, a user of the digital camera switches over a power of the digital camera 100 which is not shown to ON and prepares for the photographing (#1).

Then, the photographic optical system 21 is directed to the subject which is not shown and the shutter release button 61 is pressed and the photographing is performed.

When zooming the subject according to need, operate the camera operating unit 91 to control the zoom driving unit 26 by the system controller 80 and drive the group of lenses 28 by the zoom driving unit 26.

Here, the half-pressed detecting unit 62 detects that the shutter release button is pressed to the half-pressed position at the point the shutter release button is pressed to the half-pressed position (#2) and outputs a starting signal that is representing the command for starting the AF operation to the system controller 80.

The system controller inputs the inputted starting signal into the AF controlling unit 83 and the timer 84, and the timer 84 starts the clocking of the elapsed time (#3).

At the same time, the system controller 80 sets an at-once pressed flag and a ranging flag respectively to 0 (zero) and causes them to store to the flash memory (#3).

By the way, the at-once pressed flag is a flag identifying whether the shutter release button 61 is pressed at once to the full-pressed position or not. A value 0 represents that it is not the "at-once pressing" as well as an initial value, and a value 1 represents that it is the "at-once pressing".

On the other hand, the ranging flag is a flag identifying whether the ranging by the ranging sensor 31 is carried out appropriately. A value 0 represents that the ranging is carried out appropriately as well as an initial value, and a value 1 represents that the ranging is not carried out appropriately.

Furthermore, the AF controlling unit 83 in which the starting signal is inputted controls the outside light AF unit 81 so as to carry out the outside AF operation.

By the control of the outside light AF unit 81 by the outside light unit 83, the outside light AF unit 81 controls the ranging sensor controlling unit 32 to activate the ranging sensor 31.

Moreover, simultaneously to the control of the ranging sensor controlling unit 32, the outside light AF unit 81 controls the strobe light controlling unit 42 to emit a strobe light such as an infrared ray as an outside light for the ranging.

A reflected light is beamed from the subject that received the strobe light. The reflected light is inputted into the ranging sensor 31 which is for a passive AF, and the ranging sensor controlling unit 32 applies a principle of a triangular surveying to a phase difference of the reflected light which is detected by the ranging sensor 31 to calculate the distance to the subject.

Then, the distance to the subject is inputted into the outside light AF unit 81.

However, there is a case which the ranging is not carried out appropriately if the subject is having a repeats or the like the principle of the triangular surveying cannot appropriately calculate the distance. In such case, a signal "ranging inadequate" is inputted into the outside light AF unit 81 from the ranging sensor controlling unit 32.

At this point, the outside light AF unit 81 determines whether the ranging is carried out appropriately or not (#4).

When the ranging is carried out appropriately, the outside light AF unit 81 obtains the focusing position of the group of focus lenses 22 that corresponds to the inputted distance by referring to a Local User Terminal (LUT, reference table) which the distance to the subject and the focusing position of the group of focus lenses 22 are being associated in advance and memorized in the ROM.

Then, the outside light AF unit 81 outputs a command to the focus driving system 25 to move the group of focus lenses 22 to the obtained focusing position (#5).

The focus driving system 25 starts the driving for moving the group of focus lenses 22 to the commanded focusing position (#8).

On the other hand, when the ranging is not carried out appropriately, the outside light AF unit 81 rewrites the value of the ranging flag which is stored in the flash memory to 1 (#6) and equally sets the constant focusing position that memorized in the ROM as the focusing position of the group of focus lenses 22, and outputs a command to the focus lens driving system 25 so as to move the group of focus lenses 22 to the set constant focusing position (#7).

The focus driving system 25 starts the driving which moves the group of focus lenses 22 to the constant focusing position as the commanded focusing position (#8).

As the operation when the shutter release button 61 is pressed to the half-pressed position has been described above, in the digital camera 100 in the present embodiment, the outside AF operation is started at first when the shutter release button 61 is pressed to the half-pressed position regardless of whether or not the shutter release button 61 is pressed to the full-pressed position at once.

Next, an operation corresponding to whether or not the shutter release button 61 is pressed to the full-pressed position at once will be described.

First of all, it is determined whether the shutter release button 61 has reached to the full-pressed position or not (#9).

That is to say, the full-pressed detecting unit 63 detects that the shutter release button 61 is pressed to the full-pressed position when the shutter release button 61 is pressed to the full-pressed position, and output a performing signal which represents the command for performing the photographing to the system controller 80.

By the input of the performing signal, the AF controlling unit 83 of the system controller 80 determines that the shutter release button 61 is reached to the full-pressed position, and rewrite the value of the at-once pressed flag which is stored in the flash memory as 1.

Then, the AF controlling unit 83 refers to the clocking (elapsed time t) of the timer 84, and determines whether the clocking of the timer 84 is exceeding the second criterion time t2 memorized in the ROM or not regardless of whether the shutter release button is reached to the full-pressed position or not (#11).

At this point, a determination of whether the outside AF operation is completed is carried out by carrying out the processes (#12, #13) corresponding to the value of the at-once pressed flag when the elapsed time t of the timer 84 is exceeding the second criterion time t2 (#14), and when the elapsed time t of the timer 84 is not exceeding the second criterion time t2, then the determination of whether the outside AF operation is completed or not is carried out directly (#14).

When the outside AF operation is not completed, return to the step 9 (#9) and repeat a routine of determination of whether the full-pressing is detected or not (#9), the determination of whether the elapsed time t has exceeded the second criterion time t2 or not (#11) and the determination of whether the outside light AF operation has been completed or not (#14).

If the full-pressing is detected during the above routine, rewrite the value of the at-once pressed flag to 1 (#10), and when the elapsed time t has exceeded the second criterion time t2, then a determination of whether the value of the at-once pressed flag is 1 or not is carried out, that is, the determination of whether the full-pressing is detected prior to completion of the outside light AF operation or not is carried out (#12).

Furthermore, when the value of the at-once pressed flag is not 1, that is, when the full-pressing is not detected, then set the focusing position which is set by the outside light AF operation (position of the group of focus lenses 22 where the outside light AF operation has been completed) as the starting position of the operation of the group of focus lenses 22 operated by the CCDAF operation, and store it to the flash memory (#13).

The above mentioned routine ends when the outside light AF operation has been completed (#14), and the focusing position of the group of the focus lenses 22 at the time of completion of the operation is stored to the flash memory temporally.

Next, the AF controlling unit 83 determines whether the value of the at-once pressed flag is 1 or not (#15).

When the value of the at-once pressed flag is 1, it means that the full-pressing has been detected (#10) before the outside light AF operation is completed (#14), therefore control the AF controlling unit 83 so as to perform the photographing operation at the focusing position of the group of focus lenses which is the position where the outside AF operation has been completed (#27), and the image of the subject that projected to the CCD 24 is photo-electrically transferred and digitalized at the A/D converter 51, the predetermined signal processing is applied at the image processing unit 52 and inputted into the system controller 80, memorized to the memory which is attachable and detachable as the digital image signal and returned to the step (#2).

On the other hand, when the value of the at-once pressed flag is not 1, the AF control unit 83 confirms the value of the ranging flag since it means that the full-pressing is not yet detected (#18).

When the value of the ranging flag is not 1, that is, when the appropriate ranging is carried out, then the AF controlling unit 83 determines whether the elapsed time t is exceeding the first criterion time t1 or not (#23).

Moreover, when the elapsed time t is not exceeding the first criterion time t1, then the AF controlling unit 83 furthermore confirms whether the half-pressed position is detected or not since the time no longer determined as at-once pressing pressed by the shutter release button 61 has elapsed (#25).

When the half-pressed position has not been detected, it goes back to step 2 (#2) since it is in a condition that the shutter release button is not pressed at all, which means the photographing preparing operation itself has been ceased.

On the other hand, when the half-pressed position has been detected, the AF controlling unit 83 further confirms whether the full-pressing is detected or not (#26).

When the full-pressing condition is detected, it means that the photographing operation has been performed, therefore control the AF controlling unit 83 so as to perform the photographing operation at the focusing position of the group of focus lenses at the position where the outside AF operation has been completed (#27), and the image of the subject that projected to the CCD 24 is photo-electrically transferred and digitalized at the A/D converter 51, the predetermined signal processing is applied at the image processing unit 52 and inputted into the system controller 80, memorized to the memory which is attachable and detachable as the digital image signal and returned to the step (#2).

On the contrary, when the full-pressed condition has not been detected, it means that the half-pressed condition has been maintaining and the photographing operation has not been performed, therefore, return to the step 23 (#23) and repeat a routine of step 23 (#23), step 25 (#25) and the step 28 (#28).

When the elapsed time t exceeds the first criterion time t1 (#23), the AF controlling unit 83 controls the outside light AF unit 81 and the CCDAF unit 82 so as to start the CCDAF operation which the focusing accuracy is high by having the focusing position of the group of focus lenses 22 of the outside light AF operation which its operation has already been completed as the operation starting position (#24).

By the control of the AF controlling unit 83, the CCDAF unit 82 controls the focus driving system 25 so as to start the driving of the group of focus lenses 22 driven by the CCDAF operation.

Then, the AF controlling unit 83 repeats the determination of whether the full-pressing of the shutter release button 61 is detected or not (#21) during the time until the completion of the CCDAF operation (#18).

At this point, when the full-pressing of the shutter release button 61 is detected prior to the completion of the CCDAF operation (#21), the AF controlling unit 83 controls the CCDAF unit 82 so as to cease the CCDAF operation without waiting for the CCDAF operation to be completed as well as controls the outside light AF unit 81 to move the group of focus lenses 22 to the focusing position where the position which the outside light AF operation has been completed that stored temporally in the flash memory (#22).

Consequently, the outside light AF unit 81 controls the focus driving system 25 so as to move the group of focus lenses 22 to the temporally memorized focusing position, and after the movement of the group of focus lenses have been completed, the AF controlling unit 83 controls so as to perform the photographing operation (#27), and the image of the subject that projected to the CCD 24 is photo-electrically transferred and digitalized at the A/D converter 51, the predetermined signal processing is applied at the image processing unit 52 and inputted into the system controller 80, memorized to the memory which is attachable and detachable as the digital image signal and returned to the step (#2).

However, when the value of the ranging flag in the step 16 (#16) is 1, the focusing position of the group of focus lenses when the outside light AF operation has been completed is being as the constant focusing position, since the appropriate ranging has not been carried out, which a reliability of the focusing accuracy cannot be considered as high.

Therefore, the AF controlling unit 83 controls the CCDAF unit 82 to carry out the CCDAF operation throughout an entire range of a movable range of the group of the focus lenses 22 regardless of the group of focus lenses 22's focusing position which is at the time the outside light AF operation has been completed (#17).

But when the full-pressing of the shutter release button 61 is detected prior to completion of the CCDAF operation (#21), the AF controlling unit 83 controls the CCDAF unit 82 so as to cease the CCDAF operation without waiting for the CCDAF operation to be completed as well as controls the outside light AF unit 81 to move the group of focus lenses 22 to the focusing position (constant focusing position) which is where the outside light AF operation has been completed that stored temporally in the flash memory (#22), and carries out the process that gives priority to the focusing speed.

Consequently, the outside light AF unit 81 controls the focus driving system 25 so as to move the group of focus lenses 22 to the temporally memorized focusing position, and after the movement of the group of focus lenses has been completed, the AF controlling unit 83 controls so as to perform the photographing operation (#27), and the image of the subject that projected to the CCD 24 is photo-electrically transferred and digitalized at the A/D converter 51, the predetermined signal processing is applied at the image processing unit 52 and inputted into the system controller 80, memorized to the memory which is attachable and detachable as the digital image signal and returned to the step (#2).

On the other hand, the AF controlling unit 83 confirms whether or not the half-pressed position of the shutter release button has been detected (#19) after the completion of the CCDAF operation (#18) when the full-pressing of the shutter release button has not been detected before the CCDAF operation completes (#21).

Further, when the half-pressed position has not been detected, it goes back to step 2 (#2) since it is in a condition that the shutter release button is not pressed at all, which means the photographing preparing operation itself has been ceased.

On the other hand, when the half-pressed position has been detected, the AF controlling unit 83 further confirms whether the full-pressing is detected or not (#20).

When the full-pressing condition is detected, it means that the photographing operation has been performed, therefore controls the AF controlling unit 83 so as to perform the photographing operation at the focusing position of the group of focus lenses which is where the outside AF operation has been completed (#27), and the image of the subject that projected to the CCD 24 is photo-electrically transferred and digitalized at the A/D converter 51, the predetermined signal processing is applied at the image processing unit 52 and inputted into the system controller 80, memorized to the memory which is attachable and detachable as the digital image signal and returned to the step (#2).

As described above, according to the digital camera 100 relating to the present embodiment, since the AF controlling unit 83 controls the outside light AF operation which is operated by the outside light AF unit 81 and the CCDAF operation which is operated by the CCDAF unit 82 corresponding to the pressing condition of the shutter release button 61 and the elapsed time t, it is possible to carry out the switching over control of the AF operation responding to the user's photographing operation in more detail compared with a case controlling those AF operations only based simply on the elapsed time t.

Also, in the step 2 (#2), because the clocking of the elapsed time t is started at the step 3 (#3) soon after the detection of the half-pressing of the shutter release button and the routine having the step 23 (#23), step 25 (#25) and the step 26 (#26) are repeated until the elapsed time t reaches the first criterion time t1 even after the completion of the outside light AF operation at the step 14 (#14), there is no possibility of shifting to the CCDAF operation only by the completion of the outside light AF operation, so that it can reflect the user's photographing control appropriately to the AF operation since it is possible to detect whether the shutter release button 61 has been pressed at-once or not correctly even in a case that the outside AF operation has completed faster than expected.

Furthermore, since it is shifted to the CCDAF operation at the step 24 (#24) by the determination that there is only the half-pressing in the case the full-pressing is not detected even the elapsed time t has passed the first criterion time t1, it is possible to carry out the operation that is reflecting the intension of the user that the user wishes to carry out so-called a focus locking (the half-pressing operation of the shutter release button 61), therefore it is possible to shift to the CCDAF operation which the focusing accuracy is high.

By the way, since the digital camera 100 relating to the present embodiment is made in consideration of a so-called hybrid AF (HBAF) operation which the outside light AF operation and the CCDAF operation are combined, the scanning range of the group of focus lenses 22 at the time of the CCDAF operation is set to scan only a periphery of the focusing position at the time of the completion of the outside light AF operation rather than the entire movable range of the group of focus lenses 22 (#24), but it is recommendable to scan the entire movable range as similar to the step 17 (#17).

On the other hand, since it is immediately shifted to the photographing operation (#27) by the determination at the step 26 (#26) when the full-pressing has been detected before the first criterion time t1, the intension of user that the user wishes to perform the photographing quickly can be attained by carrying out the outside light AF operation which is the fast AF operation to appropriately reflect the user's intension.

In addition, when the half-pressed condition has been cancelled in the routine of the step 23 (#23), step 25 (#25) and step 26 (#26), the photographing preparing operation itself has been cancelled, and returns to the step 2 (#2) to be wait for the input of the shutter release button 61. Therefore, it is possible to carry out the operation that reflecting the situation when using.

Also, the rapidness of the outside light AF operation can be utilized efficiently by ceasing the CCDAF operation (#22) and carrying out the control which returns the group of focus lenses to the focusing position where the outside light AF operation has been completed, in a case the user operates the photographing performing operation by full-pressing the shutter release button 61 in rush in such a circumstance that he or she may lose a timing of releasing the shutter if to wait for the CCDAF operation to be completed such as trying to take the photograph of a child's smile instantaneously after having shifted to the CCDAF operation (#24, #17).

Moreover, by the control that selecting the faster way by comparing a remaining time t4 until the completion of the CCDAF operation with a time taking for driving the group of focus lenses 22 from a present position to the focusing position where the outside light AF operation has been completed, it is always possible to perform the photographing at fastest.

Also, the operation can be carried out that responds to the user's full-pressing operation since the determination is carried out at the step 9 (#9) when the full-pressing is detected during the outside light AF operation is operating which is carried out at first and the value of the at-once pressed flag is set to 1 at the step 10 (#10), and it is immediately shifted to the photographing performing operation after the outside AF operation has been completed (#17) when the value of the at-once pressed flag is 1 (#15).

By the way, in the case that the ranging in the outside light AF operation is inadequate (#4), that is, for example, when the ranging sensor controlling unit 32 is the passive AF operation and that the focusing by the ranging sensor 31 cannot be carried out due to the low contrast of the subject, or when there is the possibility of calculating a false focusing position due to the subject that having the repeats, it may be considered to adopt a composition that controls such a manner as to shift to the CCDAF operation immediately in favor of a focusing performance.

With such structure, there is the possibility of losing a timing for the photographing by giving an impression that it is taking ling time to perform the photographing in contradiction to the user's intension of carrying out the at-once pressing since it has been already shifted to the CCDAF operation regardless of the operation of the user's at-once pressing.

Therefore, the digital camera 100 of the present embodiment is capable of continuing the outside light AF operation which the focusing speed is prioritized by setting the constant focusing position as the moving target position (#7) even when the ranging of the outside light AF operation is inadequate by following the recognition that the user's at-once pressing operation is the intention of the user to carry out the time-lag priority (focusing speed priority).

However, even the outside light AF operation having continued and completed its operation, the possibility that the constant focusing position is at appropriate focusing position is not necessarily high.

Therefore, it is possible to inhibit a defocusing to the utmost with starting the CCDAF operation which the focusing accuracy is high early by memorizing the ranging of the outside light AF operation as adequate or inadequate (#6), and when inadequate (#16), carrying out the control of shifting to the CCDAF operation in the entire movable range of the group of focus lenses 22 (#17) without waiting for the elapsed time t to reach the first criterion time t1 (#23).

Additionally, it may be considered that it is preferable to change over to the CCDAF operation at the point the elapsed time t has reached to the second criterion time t2 in a case that the time has elapsed for a long time which cannot be considered as the at-once pressing from the starting to the completion of the outside light AF operation.

But if such switching over control is simply carried out, it has to scan again in detail by the CCDAF operation after the switching over of the AF operation regarding the movable range that having moved the group of focus lenses 22 to the obtained focusing position which is obtained by the outside light AF operation, so there is the possibility that the scanning of the that range is wasted although the circumstance may vary according to the moving distance of the group of focus lenses 22 at the time it started to drive.

In addition, since an actual focusing position does not always exist at a periphery of the obtained focusing position obtained by the outside light AF operation, it is also not preferable to scan only the periphery of the obtained focusing position obtained by the outside light AF operation by the CCDAF operation.

However, the digital camera 100 of the present embodiment, it is possible to avoid spending time for the wasteful driving by setting the position of the group of focus lenses 22 when the second criterion time t2 has elapsed as the starting position of the CCDAF operation (#13), so that the fastest completion of the AF operation can be always attained.

Here, it is recommendable to set the second criterion time t2 as an equivalent value to the first criterion time t1. In such case, it is possible to reduce a constant to memorize to the ROM, and furthermore, since it is possible to provide a determining subroutine of the elapsed time t as same one, variations of processing flowchart can be reduced.

In addition, although the digital camera 100 relates to the above embodiment, the AF controlling unit 83 uniformly ceases the CCDAF operation when the full-pressing of the shutter release button is detected (#21) before the completion of the CCDAF operation (#18), and controls the outside light AF unit 81 and CCDAF unit 82 so as to move the group of focus lenses 22 to the focusing position of the outside light AF operation that is memorized in the flash memory, the imaging apparatus of the present invention does not necessarily limited to the above stated embodiment.

That is to say, from a perspective completing the AF operation faster at the point of the detection of full-pressing in the shutter release button 61, it is preferable to select the one that the time is shorter by comparing the time taking to complete the CCDAF operation by continuing the CCDAF operation which is carried out part of the way with the time taking to move the group of focus lenses 22 to the focusing position of the outside light AF operation where the outside light AF has been completed its operation that temporally memorized in the flash memory by switching over to the outside light AF operation.

Therefore, when the time taking for the CCDAF operation to be completed t4 is shorter than the time taking to move the group of focus lenses 22 from the position of the group of focus lenses 22 which is moved by the CCDAF operation at the time the full-pressing has been detected to the focusing position of the outside light AF operation t3 (t3>t4), then the AF controlling unit 83 controls the CCDAF unit 82 so as to continue the CCDAF operation as it is.

Figure 4:
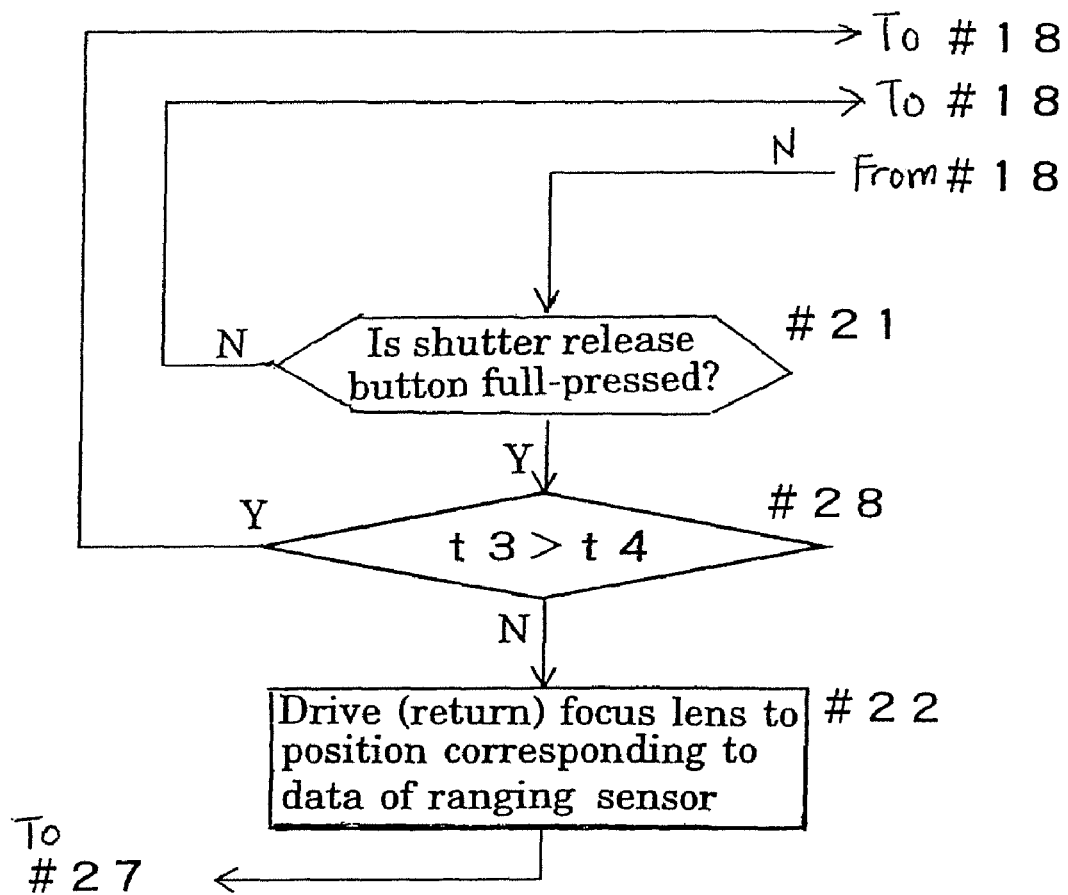
FIG. 4 is part of a flowchart showing other form of a routine in subset of the routine in the flowchart shown in FIG. 3.

That is, substitute the routine which is the step 18 (#18), step 21 (#21) and the step 22 (#22) within the flowchart shown in FIG. 3 with the routine which is the step 18 (#18), step 21 (#21), step 28 (#28) and the step 22 (#22) as shown in FIG. 4.

In this case, although the time taking to move the group of focus lenses 22 from the position of the group of focus lenses 22 which is moved by the CCDAF operation at the time the full-pressing has been detected to the focusing position of the outside light AF operation t3 can be calculated based on the moving distance, the driving speed of the focus lens driving system 25 operated by the outside AF operation of the outside AF unit 81 and the switching over time from the CCDAF operation to the outside AF operation, it is impossible to calculate the time taking for the CCDAF operation to be completed t4 accurately since the focusing position of the CCDAF operation when it has been completed is uncertain.

But it is possible to estimate the focusing position of the CCDAF operation when it has been completed to some extent based on a remaining stroke in the movable range of the group of focus lenses 22 or a transition of a rate of increase or a rate of decrease regarding the evaluated value of the image signal that has been already carried out before the detection of the full-pressing. Also by providing an estimating unit to the AF controlling unit 83 for estimating such and a comparing unit for comparing the aforementioned time t3 and t4, it is possible to realize the flowchart process shown in FIG. 4.

Although the imaging apparatus of the present invention has been described, it should be understood that the present invention is not limited to the embodiments as described above, many different embodiments of the present invention may be made without departing from the scope of the present invention.

For example, it may be recommendable to arrange the group of focus lenses 22 fixedly, providing the CCD 24 to be capable of moving in the optical axis direction and provide the focus driving system 25 to drive the CCD 24 instead of driving the group of focus lenses 22.

It is also recommendable to provide the focus driving system 25 drives not only the group of focus lenses 22 but also the entire photographic optical system 21.

As described above, according to the imaging apparatus of the present invention, because the control device controls the first auto focusing operation and the second auto focusing operation corresponding to the pressing condition of the shutter release button and the elapsed time, it is possible to carry out a switching over control with detailed response to an actual switching over intension of the auto focusing operation compared with a case simply utilizing the elapsed time to control the first auto focusing operation and the second auto focusing operation.

Because the second auto focusing operation will not be shifted inadvertently, it is possible to carry out the photographing anytime in the completed condition of the first auto focusing operation, that is, in the focused condition even tracking the dynamic subject.

It is possible to obtain the image of a high focusing accuracy in line with a photographer's intension by shifting to the second auto focusing operation since it can be considered that the subject is not such a subject the time lag should be taken into account when the command for performing the photographing is not inputted until the predetermined criterion time is elapsed.

Although there is a possibility of losing the photographing timing when the command for performing the photographing is inputted before the second auto focusing operation completes and wait for the second auto focusing operation to be completed in a case once having shifted to the second auto focusing operation which the focusing accuracy is high, it is possible to reduce the possibility of losing the photographing timing since the photographing can be immediately performed by returning to the completed condition of the first auto focusing operation which is before shifting to the second auto focusing operation.

Also, according to the imaging apparatus of the present invention, the photographing can be performed with reducing the possibility of losing the photographing timing, since it selects the faster one to be performed by comparing the time required to the selections between whether to wait for the completion of the second auto focusing operation or return to the completed condition of the first auto focusing operation which is before shifting to the second auto focusing operation when the command for performing the photographing is inputted before the second auto focusing operation completes even in the case, for example, once having shifted to the second auto focusing operation which the focusing accuracy is high.

Also, according to the imaging apparatus of the present invention, it is possible to perform the photographing in a rapidly focused condition by the first auto focusing operation in accordance with the user's intension that the user wishes to photograph by releasing the shutter rapidly.

It is possible to perform the photographing operation in line with the user's intension by carrying out the control of switching over to the second auto focusing operation which the focusing accuracy is high, because it can be considered that there is no intension of rushing to release the shutter since the position of the photographic optical system or the imaging device in a starting point of the first auto focusing operation is far away from the moving target position and the operation of performing the photographing is not carries out at the point the criterion time has elapsed in a case the first auto focusing operation is not completed even the predetermined criterion time has elapsed from starting of the first auto focusing operation.

Moreover, since the focusing position of the photographic optical system or the imaging device by the first auto focusing operation becomes as the starting position of the second auto focusing operation, there is no necessity to carry out an evaluation (searching scanning of the focusing position) throughout the entire stroke of the photographic optical system or the imaging device, therefore it is even possible to speed up the time from starting of the second auto focusing operation to the focusing compared with a case of evaluating throughout the above mentioned entire stroke.

Also, the first auto focusing device is capable of carrying out the first auto focusing operation since it sets the constant focusing position as the focusing target position.

Furthermore, since the position of the photographic optical system or the imaging device (constant focusing position) at the point of the completion of the first auto focusing operation becomes the starting position of the second auto focusing operation, there is no necessity to carry out the evaluation (searching scanning of the focusing position) throughout the entire stroke of the photographic optical system or the imaging device, therefore it is even possible to speed up the time from starting of the second auto focusing operation to the focusing compared with a case of evaluating throughout the above mentioned entire stroke.

What is claimed is:

1. An imaging apparatus comprising:
   a photographic optical system for projecting an image of a subject;
   an imaging device for outputting the projected image of the subject by converting the projected image of the subject into an image signal;
   a first auto focusing device for carrying out a first auto focusing operation corresponding to a distance value obtained by measuring a distance to said subject;
   a second auto focusing device for carrying out a second auto focusing operation corresponding to an evaluation value obtained by evaluating the image signal output by said imaging device;
   a control device for controlling said first auto focusing operation and said second auto focusing operation;
   a starting signal inputting device for inputting a command for starting a focusing operation; and
   a photographing signal inputting device for inputting a command for performing a photographing operation;
   wherein said control device starts said first auto focusing operation when said starting signal inputting device inputs said command for starting and controls said first auto focusing operation and said second auto focusing operation corresponding to an elapsed time from the inputting of the command for starting, a condition of inputting said command for starting into said starting signal inputting device and a condition of inputting said command for performing into said photographing signal inputting device at a time after the command for starting is inputted.

2. The imaging apparatus according to claim 1, wherein said control device controls so as to maintain a completed condition of said first auto focusing operation prior to a period which said command for performing is inputted into said performing signal inputting device in a period which said elapsed time reaches to a predetermined criterion time from a time of completion of said first auto focusing operation when said first auto focusing operation is completed before said elapsed time reaches to the predetermined criterion time and the inputting of said command for starting to said starting signal inputting device is maintained and said command for performing is not inputted into said performing signal inputting device at the time of completion of said first auto focusing operation.

3. The imaging apparatus according to claim 2, wherein said control device controls so as to start said second auto focusing operation when said command for performing is not inputted into said performing signal inputting device during the period which said elapsed time reaches to said criterion time from the time of completion of said first auto focusing operation.

4. The imaging apparatus according to claim 3, wherein said control device controls so as to perform the photographing operation by ceasing said second auto focusing operation and returning to the completed condition of said first auto focusing operation when said command for performing is inputted into said performing signal inputting device after starting and before completion of said second auto focusing operation.

5. The imaging apparatus according to claim 3, wherein said control device controls so as to perform the photographing operation by comparing a time required for returning to the completed condition of said first auto focusing operation by ceasing said second auto focusing operation with an estimated time required for completion of said second auto focusing operation by continuing said second auto focusing operation, and by selecting and performing the operation that completes in shorter time between the two operations when said command for performing is inputted into said performing signal inputting device after starting and before completion of said second auto focusing operation.

6. The imaging apparatus according to claim 2, wherein said control device controls so as to perform the photographing operation by completion of said first auto focusing operation at a time of inputting said command for performing when said command for performing is inputted into said performing signal inputting device during the period which said elapsed time reaches to said criterion time from the time of completion of said first auto focusing operation.

7. The imaging apparatus according to claim 1, wherein said first auto focusing device sets a constant focusing position as the focusing position corresponding to said distance value when said distance value cannot be obtained with a predetermined accuracy, and said control device controls so as to start said second auto focusing operation from where the constant focusing position is completed regardless of said elapsed time.

8. The imaging apparatus according to claim 1, wherein said control device controls so as to pause said second auto focusing operation when said command for performing is inputted into said performing signal inputting device before completion of the second auto focusing operation from start thereof, and so as to perform the photographing operation while moving at least one of at least part of the photographic optical system and the imaging device to a first focusing position.

9. The imaging apparatus according to claim 1, wherein said control device controls so as to pause said second auto focusing operation when said command for performing is inputted into said performing signal inputting device before completion of the second auto focusing operation from start thereof, and, and so as to perform the photographing operation by comparing a time requiring movement of at least one of at least part of the photographic optical system and the imaging device to a first focusing position with a time required until completion of the second auto focusing operation and selecting and performing one operation completing at a shorter time of the compared two operations.

* * * * *